US011042721B2

(12) United States Patent
Hansen

(10) Patent No.: US 11,042,721 B2
(45) Date of Patent: Jun. 22, 2021

(54) ULTRASONIC FINGERPRINT SENSOR

(71) Applicant: FINGERPRINT CARDS AB, Gothenburg (SE)

(72) Inventor: Roy Hansen, Dragør (DK)

(73) Assignee: FINGERPRINT CARDS AB, Gothenburg (SE)

( * ) Notice: Subject to any disclaimer, the term of this patent is extended or adjusted under 35 U.S.C. 154(b) by 62 days.

(21) Appl. No.: 16/661,487

(22) Filed: Oct. 23, 2019

(65) Prior Publication Data

US 2020/0134279 A1 Apr. 30, 2020

(30) Foreign Application Priority Data

Oct. 29, 2018 (SE) .................................... 1851337-4

(51) Int. Cl.
G06K 9/00 (2006.01)
G10K 11/34 (2006.01)
G06K 9/20 (2006.01)

(52) U.S. Cl.
CPC ........... G06K 9/0002 (2013.01); G06K 9/209 (2013.01); G10K 11/34 (2013.01)

(58) Field of Classification Search
CPC ...... G06K 9/0002; G06K 9/209; G10K 11/34; G10K 11/346
See application file for complete search history.

(56) References Cited

U.S. PATENT DOCUMENTS

| 9,824,254 | B1 | 11/2017 | Yazdandoost et al. |
| 9,984,271 | B1 | 5/2018 | King et al. |
| 10,198,610 | B1 | 2/2019 | Yousefpor et al. |
| 2014/0354596 | A1* | 12/2014 | Djordjev ............... G06F 3/0421 |
| | | | 345/175 |
| 2014/0359757 | A1 | 12/2014 | Sezan et al. |
| 2015/0015515 | A1 | 1/2015 | Dickinson et al. |
| 2017/0053151 | A1 | 2/2017 | Yazandoost et al. |
| 2018/0046836 | A1* | 2/2018 | Hinger ................ G06K 9/0002 |
| 2020/0234023 | A1* | 7/2020 | Tsai .......................... G01L 1/16 |

OTHER PUBLICATIONS

Swedish Search Report for SE Application No. 1851337-4 dated May 14, 2019 (2 pages).

* cited by examiner

*Primary Examiner* — Abhishek Sarma
(74) *Attorney, Agent, or Firm* — RMCK Law Group, PLC

(57) ABSTRACT

The present disclosure relates to an ultrasonic fingerprint sensor comprising an array of ultrasonic transducers, one microcontroller unit (MCU) configured for obtaining a configuration of the transducers, and a plurality of parallel mixed-signal Application-Specific Integrated Circuits (ASIC), each configured to be communicatively connected with the MCU and for Analogue-Digital (AD) conversion of analogue signals from the transducers to digital data and comprising a respective data storage for storing said digital data. The sensor also comprises, for each of the mixed-signal ASICs, a plurality of parallel front-end ASICs, each configured to be communicatively connected with said mixed-signal ASIC and for controlling a respective group of the transducers in accordance with the obtained configuration.

13 Claims, 3 Drawing Sheets

ULTRASONIC FINGERPRINT SENSOR

CROSS-REFERENCE TO RELATED APPLICATIONS

This application claims priority to Swedish Patent Application No. 1851337-4, filed on Oct. 29, 2018. The disclosure of the above application is hereby incorporated by reference in its entirety.

TECHNICAL FIELD

The present disclosure relates to an ultrasonic fingerprint sensor comprising a peripherally arranged transducer array.

BACKGROUND

Ultrasonic transducers may be used for capturing fingerprints on a substrate, e.g. a screen glass of a smartphone. The transducers may be peripherally arranged around a part of the substrate and the fingerprint may then be captured anywhere on said part of the substrate. Such an acoustic fingerprint imaging system is disclosed in US 2017/0053151.

US 2014/0359757 and U.S. Pat. No. 9,984,271 each generally discloses the use of Application Specific Integrated Circuit (ASIC) for control circuitry of ultrasonic transducers for fingerprint capturing.

SUMMARY

It is an objective of the present invention to provide an improved ultrasonic fingerprint sensor.

According to an aspect of the present invention, there is provided an ultrasonic fingerprint sensor comprising an array of ultrasonic transducers, one microcontroller unit (MCU) configured for obtaining a configuration of the transducers, and a plurality of parallel mixed-signal ASICs, each configured to be communicatively connected with the MCU and for Analogue-Digital (AD) conversion of analogue signals from the transducers to digital data and comprising a respective data storage for storing said digital data. The sensor also comprises, for each of the mixed-signal ASICs, a plurality of parallel front-end ASICs, each configured to be communicatively connected with said mixed-signal ASIC and for controlling a respective group of the transducers in accordance with the obtained configuration.

According to another aspect of the present invention, there is provided an electronic device comprising host processing circuitry, a screen comprising a display and a cover covering said display, and an embodiment of the ultrasonic fingerprint sensor of the present disclosure comprising a one-dimensional array of ultrasonic transducers peripherally arranged along at least one side of the screen beside the display and below the cover. The MCU is configured to be communicatively connected with the host processing circuitry.

According to another aspect of the present invention, there is provided a method of transferring data of an ultrasonic fingerprint sensor. The sensor comprises an array of ultrasonic transducers, one MCU, and a plurality of parallel mixed-signal ASICs, each communicatively connected with the MCU and comprising a respective data storage. The sensor also comprises, for each of the mixed-signal ASICs, a plurality of parallel front-end ASICs, each communicatively connected with said mixed-signal ASIC and controlling a respective group of the transducers. The method comprises, in at least one of the mixed-signal ASICs: during a time period while a fingerprint is being captured by the fingerprint sensor, receiving analogue signals of the transducers from at least one of its connected front-end ASICs; converting the analogue signals to digital data; storing the digital data in its data storage; obtaining an indication that the fingerprint is no longer being captured; and sending the digital data via the MCU to processing circuitry of a host.

According to another aspect of the present invention, there is provided a computer program product comprising computer-executable components for causing an ultrasonic fingerprint sensor to perform an embodiment of the method of the present disclosure when the computer-executable components are run on processing circuitry associated with the sensor.

By means of the mixed-signal ASIC comprising a data storage, e.g. a Random-Access Memory (RAM) as exemplified herein, the digital data resulting from the AD conversion of the analogue signals can be stored locally in each of the mixed-signal ASICs before it is forwarded to the host system. Thus, the digital data can be forwarded batch wise at an opportune time, e.g. after the fingerprint has been fully captured, at relatively high data transfer speed, rather than being forwarded continuously in real-time. This reduces power consumption and processing resources needed for the forwarding, and makes the forwarding more flexible. It should also be noted that the digital data is less heavy to forward than the raw data of the analogue signals why the AD conversion within the sensor is advantageous.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
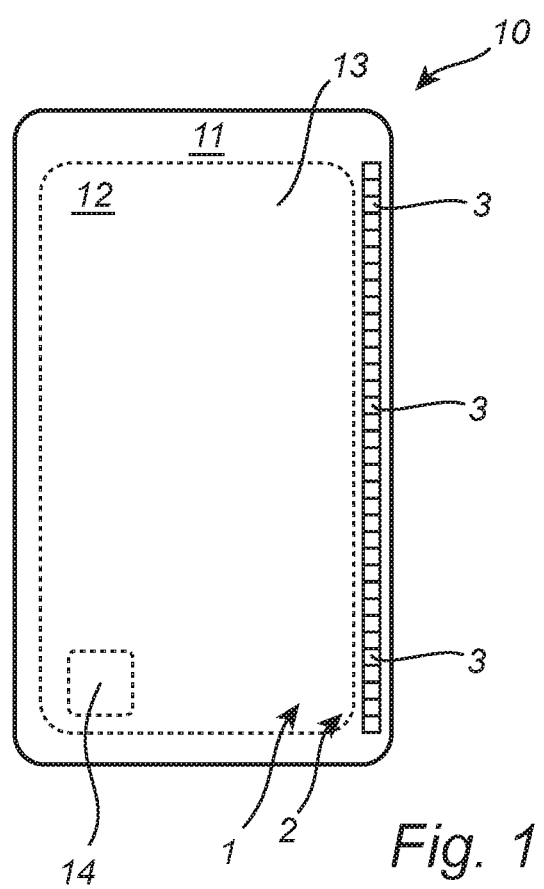
FIG. 1 is a schematic plan view, partly in section, of an electronic device comprising an ultrasonic fingerprint sensor, in accordance with some embodiments of the present invention.

FIG. 1 illustrates an embodiment of an electronic device 10 in accordance with the present invention. The electronic device may be any device or user equipment (UE), mobile or stationary, e.g. enabled to comprise a fingerprint sensor 2, for instance but not limited to e.g. mobile phone, smartphone, sensors, meters, vehicles (e.g. a car), household appliances, medical appliances, media players, cameras, or any type of consumer electronic, for instance but not limited to television, radio, lighting arrangements, tablet computer, laptop, or personal computer (PC). In some currently preferred embodiments, the device 10 may be a mobile UE, e.g. a smartphone or a tablet computer.

The electronic device 10 comprises a screen 11. The screen 11 comprises a display 12, in at least a part of the screen area, and a cover 13 covering the display 12 but also extending beyond the display in at least one lateral direction. The cover is typically transparent for allowing the display 12 to be visible there through to a user of the device 10, and may e.g. be made of glass. Both the display 12 and the cover 13 may be comprised in a stack of layers in the screen 11, optionally also comprising other conventional layers of such a stack, e.g. a touch layer (if the screen 11 is a touch screen) and/or a lighting layer (e.g. if the display 12 is back-lit). All layers of the stack are extending in substantially parallel planes in the screen 11.

In accordance with the present invention, the electronic device 10 comprises an ultrasonic fingerprint sensor (schematically referred to as 1). The sensor 1 comprises an array 2 of transducers 3, each transducer being configured to transform electrical signals to ultrasonic signals and/or vice versa. The array 2 may be a one-dimensional array arranged in the screen 11 beside the display 12, typically in a same plane as the display 12, thus being peripherally arranged as discussed herein. The array 2 may be peripherally arranged around the whole display 12, e.g. along all four sides of the display (if the display is rectangular), or the array may be peripherally arranged along all or part of only one or some of the sides of the display. Preferably, the array 2 is arranged peripherally such as to allow ultrasonic fingerprint capturing over the whole area of the display 12.

The transducers 3 of the array 2 are typically arranged in association (e.g. in direct contact with) the cover 13 such that ultrasonic waves sent from said transducers propagate in the cover along the plane of the cover. The transducers 3 may e.g. be connected to the underside of the cover 13. Similarly, ultrasonic waves propagating in the cover along the plane of the cover may be received by the (same or other) transducers and transformed to analogue electrical signals.

In short, the functioning of the ultrasonic fingerprint sensor 1 may be described as sending ultrasonic wave(s) from multiple transducers 3 mounted to the cover 13 on one or more sides of the display 12, at (same or other) multiple transducers 3, receiving the scattered reflection from a fingerprint topography contacting the cover 13, reconstructing the fingerprint image from the received reflections by means of image processing means in the sensor 1 or in the host.

The electronic device 10 also comprises processing circuitry 14 as well as functionality acting as a host to the fingerprint sensor. At least a part of said processing circuitry can be regarded as comprised in said host. Optionally, at least some of said processing circuitry can be regarded as comprised in, or otherwise associated with, the sensor 1. The processing means 14 may also comprise the image processing means mentioned herein.

Figure 2:
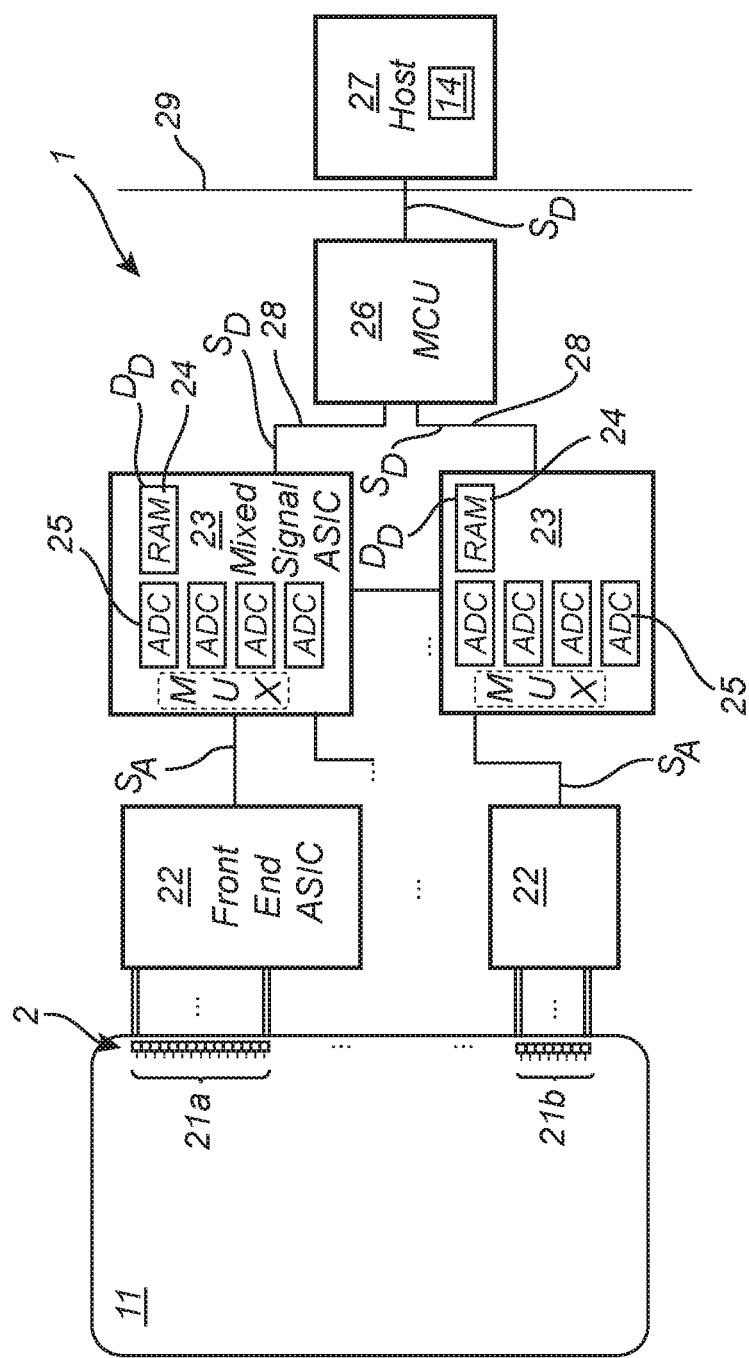
FIG. 2 is a schematic block diagram of an ultrasonic fingerprint sensor, in accordance with some embodiments of the present invention.

FIG. 2 illustrates an embodiment of the ultrasonic sensor 1, and its relation to the screen 11 and host 27 of the electronic device 10.

The sensor 1 comprises an array 2 of transducers 3. The transducers 3 are grouped together into a plurality of transducer groups 21, herein represented by the groups 21a and 21b, but the number of groups 21 depends on the number of front-end ASICs 22 in the sensor.

Each group 21 of transducers 3 is controlled by a respective front-end ASIC 22. The front-end ASIC 22 is also communicatively connected with a mixed-signal ASIC 23 and configured to forward analogue signals $S_A$ from the transducers in the group to said mixed-signal ASIC. Each front-end ASIC 22 is typically communicatively connected with only one mixed-signal ASIC. For instance, up to eight, e.g. two to eight, front-end ASICs, each controlling its respective transducer group 21, may be connected to each mixed-signal ASIC in the sensor.

The sensor 1 comprises a plurality of mixed-signal ASICs 23, each connected to a respective plurality of front-end ASICs 22 and configured to receive the respective analogue signals $S_A$ from said plurality of front-end ASICs (corresponding to the fingerprint topography of a finger in contact with the cover 13) and convert the analogue signals to digital data $D_D$ by means of at least one, preferably a plurality of, analogue-to-digital converter(s) (ADC) 25 comprised in the mixed-signal ASIC, e.g. one ADC per front-end ASIC 22 connected to the mixed-signal ASIC 23 in cooperation with a multiplexer MUX for separating the respective analogue signals $S_A$ from the different front-end ASICs. Each mixed-signal ASIC 23 also comprises a data storage 24, in which the digital data $D_D$ is stored in wait for being forwarded to the host 27. The mixed-signal ASICs may also be configured for controlling the overall timing of the respective transducer groups 21 connected thereto via front-end ASICs 22. In contrast to the front-end ASICs 22, which are typically not directly communicatively connected to each other, the mixed-signal ASICs may in some embodiments be connected with each other for direct communication there between.

The sensor 1 comprises an MCU 26, typically only one, with which all of the plurality of mixed-signal ASICs 23 in the sensor are communicatively connected. The MCU 26 may be configured for calculating the transducer configurations, e.g. defining at which time periods which transducers 3 should act as transmitters or receivers of ultrasonic waves in the cover 13. The MCU may also be configured for more generally controlling power management and timing. The MCU 26 may be connected to the mixed-signal ASICs via at least one serial bus 28, preferably a plurality of serial buses, e.g. one serial bus 28 per mixed-signal ASIC 23. Further, the MCU 26 is connected to a host 27 via an interface 29, e.g. a Serial Peripheral Interface (SPI). The MCU is configured for forwarding the digital data $D_D$ from each of the mixed-signal ASICs 23, and previously stored in the respective data storages 24 thereof, to the host, e.g. for image processing based on said digital data to obtain a fingerprint image. The digital data may then be forwarded via the serial buses 28 and the interface 29.

The host may e.g. comprise an MCU of the electronic device 10 but external to the sensor 1, e.g. associated with processing circuitry 14 of the electronic device 10 and configured for image processing. The interface 29 may have a clock frequency of at least 10 MHz, e.g. at least 15 MHz or at least 20 MHz, thus being able to transfer the digital data $D_D$ in a relatively short time, e.g. at a rate of at least 1 Mbyte/s. Thus, the digital data can be sent batch wise from the data storages 24 to the host 27 at a suitable time, e.g. after all information regarding a fingerprint has been collected by the transducers during a fingerprint capturing cycle, obviating the need for real-time sending of data to the host.

That different entities herein, such as the host, MCU, mixed-signal ASICs and front-end ASICs are communicatively connected with each other as stated herein implies that they are able to communicate with each other. Typically, this implies a galvanic connection there between, but wireless options are not excluded.

Advantageously, the sensor may be fully scalable such that a smaller cover 13 or display 12 may need fewer transducers 3 and consequently fewer front-end ASICs 22 and mixed-signal ASICs 23 than a larger cover/display while still covering the whole area of the display. It can also be scaled down in case only a sub-area, configured for fingerprint detection, of the display should be covered by the sensor.

After image analysis, the fingerprint may be available in the host 27 for further action, e.g. matching against a stored fingerprint template.

Figure 3:
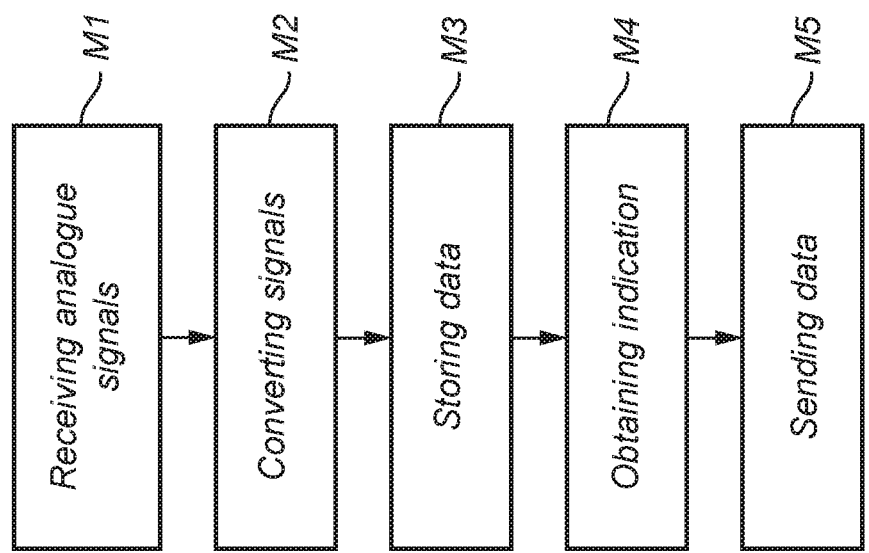
FIG. 3 is a schematic flow chart of a method in accordance with some embodiments of the present invention.

FIG. 3 is a flow chart of an embodiment of the method of transferring data of the ultrasonic fingerprint sensor 1, of the present invention.

The fingerprint sensor 1 comprises an array 2 of ultrasonic transducers 3, one MCU 26, and a plurality of parallel mixed-signal ASICs 23, each mixed-signal ASIC being communicatively connected with the MCU 26 and comprising a respective a data storage 24. The fingerprint sensor 1 also comprises, for each of the mixed-signal ASICs 23, a plurality of parallel front-end ASICs 22, each front-end ASIC being communicatively connected with said mixed-signal ASIC and controlling a respective group 21 of the transducers.

The method comprises, in at least one of the mixed-signal ASICs 23, during a time period while a fingerprint is being captured by the fingerprint sensor 1, receiving M1 analogue signals $S_A$ of the transducers from at least one of its connected front-end ASICs 22. The method then also comprises the at least one mixed-signal ASIC 23 converting M2 the analogue signals to digital data $D_D$. The method also comprises the at least one mixed-signal ASIC 23 storing M3 the digital data in the data storage 24 in said mixed-signal ASIC. The method also comprises the at least one mixed-signal ASIC 23 obtaining M4 an indication that the fingerprint is no longer being captured. Then the method also comprises the at least one mixed-signal ASIC 23 sending M5 the digital data via the MCU 26 to processing circuitry 14 of the host 27.

In some embodiments of the present invention, the array 2 of ultrasonic transducers 3 is a one-dimensional array. In contrast to e.g. a two-dimensional array arranged beneath a sensor area on which a fingerprint is captured, a one-dimensional array may be peripherally arranged and capture a fingerprint by means of ultrasonic waves propagating in the plane of the sensor area, e.g. covering the whole display area of an electronic device 10.

In some embodiments of the present invention, the plurality of mixed-signal ASICs 23 is within the range of 2-4 mixed-signal ASICs, i.e. the sensor 1 comprises a number of mixed-signal ASICs 23 which number is within the range of 2-4. Thus, the MCU 26 is connected to at least 2 discrete mixed-signal ASICs 23, distributing the control of the transducers 3. The respective mixed-signal ASICs may be mounted to the same or different printed circuit board(s) (PCB), e.g. flexible PCB, but it may be preferable with all mixed-signal ASICs being mounted to the same PCB.

In some embodiments of the present invention, the plurality of front-end ASICs 22 is within the range of 2-8 front-end ASICs for each of the mixed-signal ASICs 23. This implies that each mixed-signal ASIC is connected to a number of discrete front-end ASICs which number is within the range of 2-8. Thus, the control of the transducers 3 is further distributed. The respective front-end ASICs may be mounted to the same or different printed circuit board(s) (PCB), e.g. flexible PCB, but it may be preferable with all front-end ASICs being mounted to the same PCB.

In some embodiments of the present invention, all of the front-end ASICs 22, the mixed-signal ASICs 23 and the MCU 26 are mounted on the same PCB, preferably a flexible PCB, e.g. which is attached between the transducer array 2 and a main PCB of the host 27.

In some embodiments of the present invention, the plurality of mixed-signal ASICs 23 are configured to be communicatively connected with the MCU 26 by means of a plurality of serial buses 28, e.g. by means of a respective serial bus of each of the plurality of mixed-signal ASICs. By means of a plurality of serial buses, connected in parallel to the MCU, the transfer speed of the digital data $D_D$ as it is being forwarded to the host 27 via the MCU may be increased.

In some embodiments of the present invention, each of the mixed-signal ASICs 23 is configured to store the digital data $D_D$ in its data storage 24 during a time period while a fingerprint is being captured by the fingerprint sensor 1. Said mixed-signal ASIC may then also be configured to transfer the stored digital data to the host processing circuitry 14 after said time period when the fingerprint is no longer being captured. In this way, the digital data can be transferred as a batch in a more efficient manner. The data storage 24 may thus have a capacity which is sufficient to store M3 all the digital data $D_D$ corresponding to the received M1 analogue signals $S_A$ during the time period while the fingerprint is being captured, i.e. the data storage has a capacity for storing all the digital data generated by capturing the fingerprint. These embodiments may allow the fingerprint to be captured faster by doing all of the capturing before the digital data is sent M5 via the MCU. Thus, the capturing is not delayed by the transfer time for sending M5 the digital data.

The time period during which the fingerprint is being captured may be within the range of 5-100 ms, e.g. within the range of 15-80 ms. When using a one-dimensional array 2, e.g. arranged peripherally along a side of the screen 11, the time period for capturing a fingerprint is typically longer than when using a two-dimensional array which is positioned under the screen, since the travel distance from the transducers to the fingerprint (and back again) is longer. For instance, when detecting a fingerprint anywhere on a smartphone screen, the average travel distance may e.g. within the range of 20-50 mm. As an example, an average travel distance of 30 mm may result in about 7 μs of data collection (per channel). Thus, if there are 1000 recordings (e.g. one per transducer) for capturing the fingerprint, the capturing time period is 7 ms, and if 10000 recordings are used, the capturing time period is 70 ms. There may conveniently be a number of recordings within the range of 1000-10000, e.g. corresponding to as many transducers in the array. In accordance with embodiments of the present invention, the digital data generated by the capturing can be stored locally in the data storage 24 of the mixed-signal ASICs 23 so as not to prolong the capturing time period. The stored digital data may then be sent M5 as a batch, which may e.g. take 100-500 ms.

In some embodiments of the present invention, the MCU 26 has an SPI 29 having a clock frequency of at least 10 MHz, e.g. at least 15 MHz or at least 20 MHz, enabling a relatively high data transfer speed (herein also referred to as rate) via the MCU.

In some embodiments of the present invention, the digital data $D_D$ is sent at a rate of at least 1 Mbyte/s.

Figure 4:
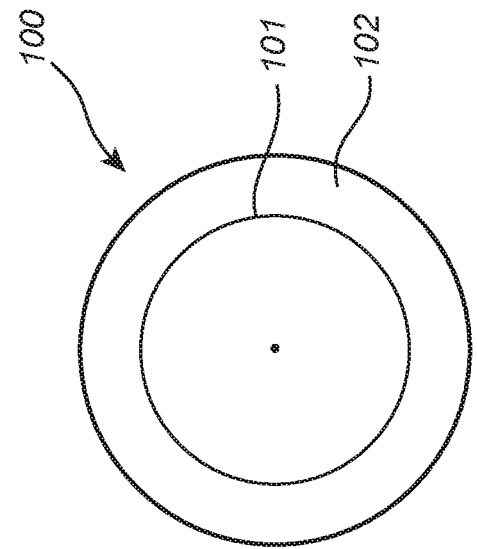
FIG. 4 is a schematic illustration of a computer program product in accordance with some embodiments of the present invention.

FIG. 4 illustrates an embodiment of a computer program product 100. The computer program product 100 comprises a computer readable (e.g. non-volatile and/or non-transitory) medium 102 comprising software/computer program 101 in the form of computer-executable components. The computer program 101 may be configured to cause a fingerprint sensor 1, e.g. as discussed herein, to perform an embodiment of the method of the present disclosure. The computer program may be run on the processing circuitry 14 of the sensor 1 and/or of the host 27 for causing the sensor to perform the method. The computer program product 100 may e.g. be comprised in a storage unit or memory 24 comprised in the sensor 1, e.g. at least partly in the mixed-signal ASIC 23, and associated with the processing circuitry. Alternatively, the computer program product 100 may be, or be part of, a separate, e.g. mobile, storage means/medium, such as a computer readable disc, e.g. CD or DVD or hard disc/drive, or a solid state storage medium, e.g. a RAM or Flash memory. Further examples of the storage medium can include, but are not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Embodiments of the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

Thus, according to an aspect of the present invention, there is provided a computer program product 100 comprising computer-executable components 101 for causing an ultrasonic fingerprint sensor 2 to perform an embodiment of the method of the present disclosure when the computer-executable components are run on processing circuitry associated with the sensor.

Similarly, according to another aspect of the present invention, there is provided a computer program product 100 comprising a computer program 101 comprising computer program code which is able to, when run on processing circuitry of the sensor 1, cause the sensor to perform an embodiment the method of the present disclosure, and further comprising a computer readable means 102 on which the computer program is stored.

Below follows an example method in accordance with some embodiments of the present invention, by which some optional features of the invention are illustrated.

Step 1- Finger on Display

A user places the finger on the cover 13 over the display 12. On a UE such as a smartphone this may e.g. be detected using the touch screen controller, but it may also or alternatively be possible to detect it using the ultrasonic sensor 1 itself e.g. by intermittent scanning thereof.

The output from this step may be a finger detection with a rough position of where on the cover the finger is detected.

Step 2- Identification Request Triggered

The decision to do an identification of the detected finger may be made based on many different criteria. It can e.g. be an identification needed to unlock the device 10 or to start an application or confirm a payment or the like.

Typically, (in a Mobile Terminal) this decision is done outside of sensor 1.

The output from this step may be a request to identify a finger at a rough position on the cover 13.

Step 3- Calculation of Transducer Configuration

In the ultrasonic sensor 1, several transducers 3 (up to all transducers) are activated at the same time. By calculating the respective distances between the finger position on the cover and each individual transducer used for transmission of ultrasonic waves it may be possible to adjust the time (and in a more complex solution also amplitude) difference between the individual transducer transmissions so that the energy in the resulting sonic wave can be concentrated to the position where the fingerprint topography is in contact with the cover. This may lead to improved resolution and may decrease the number of transducers that is needed.

In this step, the distance between the finger and each transducer 3 along the cover may be calculated. This can be translated to the timing difference needed when sending the combined ultrasonic wave.

The timing is preferably calculated so that the path difference between each transducer 3 and the focal point at the fingerprint is less than $\lambda/4$ (where $\lambda$ is the wavelength of the ultrasonic sound used).

Similar calculations can be done in order to determine in which time interval the scattered reflection wave arrives from the fingerprint topography to each transducer, so that only the data (reflected soundwaves) that actually carry information preferably are captured (sampled) by means of transducers (same or different from those used for transmission).

The calculations may be done in the host processing circuitry 14, but whey could in other embodiments be done in the MCU 26 or elsewhere in the sensor 1.

The output from this step may be the timing for the (individual or plurality of) transducers 3 that are needed for transmitting, as well as the time interval for receiving the scattered reflections thereof.

Step 4- Transfer of Configuration

In this step the calculated timing configuration from Step 3 is transferred to the MCU 26 and the Mixed Signal ASICs 23. The timing data for transmission is used to set clock counters in the front-end ASICs 22 so that the transducers 3 have the correct individual timing.

Step 5- Ultrasonic Wave Generation

The controlling Mixed Signal ASIC 23 may use an existing external clock to generate a higher-frequency internal clock for synchronization. The frequency is high enough to ensure the accuracy as indicated in step 3.

Switches in the front-end ASICs 22 selects the transducers 3 for transmission, and voltage is supplied to charge said selected transducers.

With the high-frequency internal clock running and the sensor entities in sync, the controlling mixed-signal ASIC 23 may activate the selected transducers via the corresponding front-end ASICs.

The front-end ASICs 22 may use the clock counters (as mentioned in step 4) to activate each transducer 3 (or group of transducers) in synch with the high-frequency clock.

The result from Step 5 may be a combined ultrasonic wave travelling in the cover 13, with a beam focus as calculated in step 3.

When the transmission is complete, at least some (used for transmission or not) front-end ASIC 22 switches to reception, and each transducer 3, selected for reception, may be connected to a low noise amplifier.

Step 6- Reception of Reflected Fingerprint

While the transducers 3 are being switched to reception, the ultrasonic wave travels in the cover 13 towards the fingerprint topography. The wave is scattered at the structures in said fingerprint topography on the cover, and the reflections may be detected via the receiving transducers.

The signal received by the transducers may be amplified in the connected front-end ASICs 22.

Step 7- AD Conversion and Storing of Data

The, possibly amplified, received analogue signal $S_A$ is fed to the connected mixed-signal ASIC(s) 23. Since it may be known from steps 3 and 4 when the reflected scattered signal is expected to arrive at each transducer 3, the mixed-signal ASIC may only need to run its ADCs 25 to sample the analogue signal during a limited time interval. This may also ensure that the amount of digital data $D_D$ is kept down that the sampled data has relevance to the fingerprint capturing.

The sampled data $D_D$ is stored in the data storage 24 in the mixed-signal ASIC 23 for later retrieval and forwarding.

Since the number of simultaneous ADCs 25 may be limited for power reasons, steps 5-7 may be repeated several repetitions until the fingerprint is regarded as captured. The same ultrasonic wave may be transmitted each of said repetitions, but only a predetermined number of respective transducer signals may be sampled each repetition. This loop of repetitions may end when a sufficient number of signals have been sampled. The number of repetitions needed may depend on the finger position, and may include all transducers or only a predetermined some of the transducers.

Step 8- Transfer of Data to Host

As the data $D_D$ is stored in the mixed-signal ASICs 23, it may be transferred to the MCU 26 and host 27 at the speed supported by those components and the connections 28 and 29 there between. Typically in a mobile terminal, an SPI frequency of up to 20 MHz is supported.

Step 9- Reconstruction

The sampled image may then be used to reconstruct the fingerprint image by means of image processing means 14 in the host 27. Reconstruction can start in parallel with the data transfer as soon as data $D_D$ from one mixed-signal ASIC is available.

The algorithm used for reconstruction may be a conventional algorithm for fingerprint capturing.

After the reconstruction, the fingerprint image may be available in the host 27 for further actions (e.g. matching). The process of matching and identification may be done in a conventional way.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method of transferring data of an ultrasonic fingerprint sensor comprising:
   an array of ultrasonic transducers,
   one microcontroller unit (MCU),
   a plurality of parallel mixed-signal Application-Specific Integrated Circuits (ASIC) each communicatively connected with the MCU and comprising a respective a data storage, and
   for each of the mixed-signal ASICs, a plurality of parallel front-end ASICs, each communicatively connected with said mixed-signal ASIC and controlling a respective group of the transducers;
   the method comprising, in at least one of the mixed-signal ASICs:
   during a time period while a fingerprint is being captured by the fingerprint sensor, receiving analogue signals of the transducers from at least one of its connected front-end ASICs;
   converting the analogue signals to digital data;
   storing the digital data in its data storage;
   obtaining an indication that the fingerprint is no longer being captured; and
   sending the digital data via the MCU to processing circuitry of a host.

2. The method of claim 1, wherein the digital data is sent at a rate of at least 1 Mbyte/s.

3. The method of claim 1, wherein the time period while the fingerprint is being captured is within the range of 15-80 ms.

4. A non-transitory computer-readable storage medium comprising computer-executable instructions stored thereon for causing an ultrasonic fingerprint sensor to perform the method of claim 1 when the computer-executable instructions are executed by processing circuitry associated with the sensor.

5. An ultrasonic fingerprint sensor comprising:
   an array of ultrasonic transducers;
   one microcontroller unit (MCU) configured for obtaining a configuration of the transducers;
   a plurality of parallel mixed-signal Application-Specific Integrated Circuits (ASIC) each configured to be communicatively connected with the MCU and for Analogue-Digital (AD) conversion of analogue signals from the transducers to digital data and comprising a respective data storage for storing said digital data; and
   for each of the mixed-signal ASICs, a plurality of parallel front-end ASICs, each configured to be communicatively connected with said mixed-signal ASIC and for controlling a respective group of the transducers in accordance with the obtained configuration.

6. The sensor of claim 5, wherein the array of ultrasonic transducers is a one-dimensional array.

7. The sensor of claim 5, wherein the plurality of mixed-signal ASICs is within the range of 2-4 mixed-signal ASICs.

8. The sensor of claim 5, wherein the plurality of front-end ASICs is within the range of 2-8 front-end ASICs for each of the mixed-signal ASICs.

9. The sensor of claim 5, wherein the plurality of mixed-signal ASICs are configured to be communicatively connected with the MCU by means of a plurality of serial buses.

10. The sensor of claim 9, wherein the plurality of mixed-signal ASICs are configured to be communicatively connected with the MCU by means of a respective serial bus of each of the plurality of mixed-signal ASICs.

11. An electronic device comprising:
host processing circuitry;
a screen comprising a display and a cover covering said display; and
the ultrasonic fingerprint sensor of claim 5 comprising a one-dimensional array of ultrasonic transducers peripherally arranged along at least one side of the screen, beside the display and below the cover;
wherein the MCU is configured to be communicatively connected with the host processing circuitry.

12. The device of claim 11, wherein each of the mixed-signal ASICs is configured to store the digital data in its data storage during a time period while a fingerprint is being captured by the fingerprint sensor, and to transfer the stored digital data to the host processing circuitry after said time period when the fingerprint is no longer being captured.

13. The device of claim 12, wherein the MCU has a Serial Peripheral Interface (SPI) having a clock frequency of at least 10 MHz, e.g. at least 15 MHz or at least 20 MHz.

* * * * *